Figure 1:
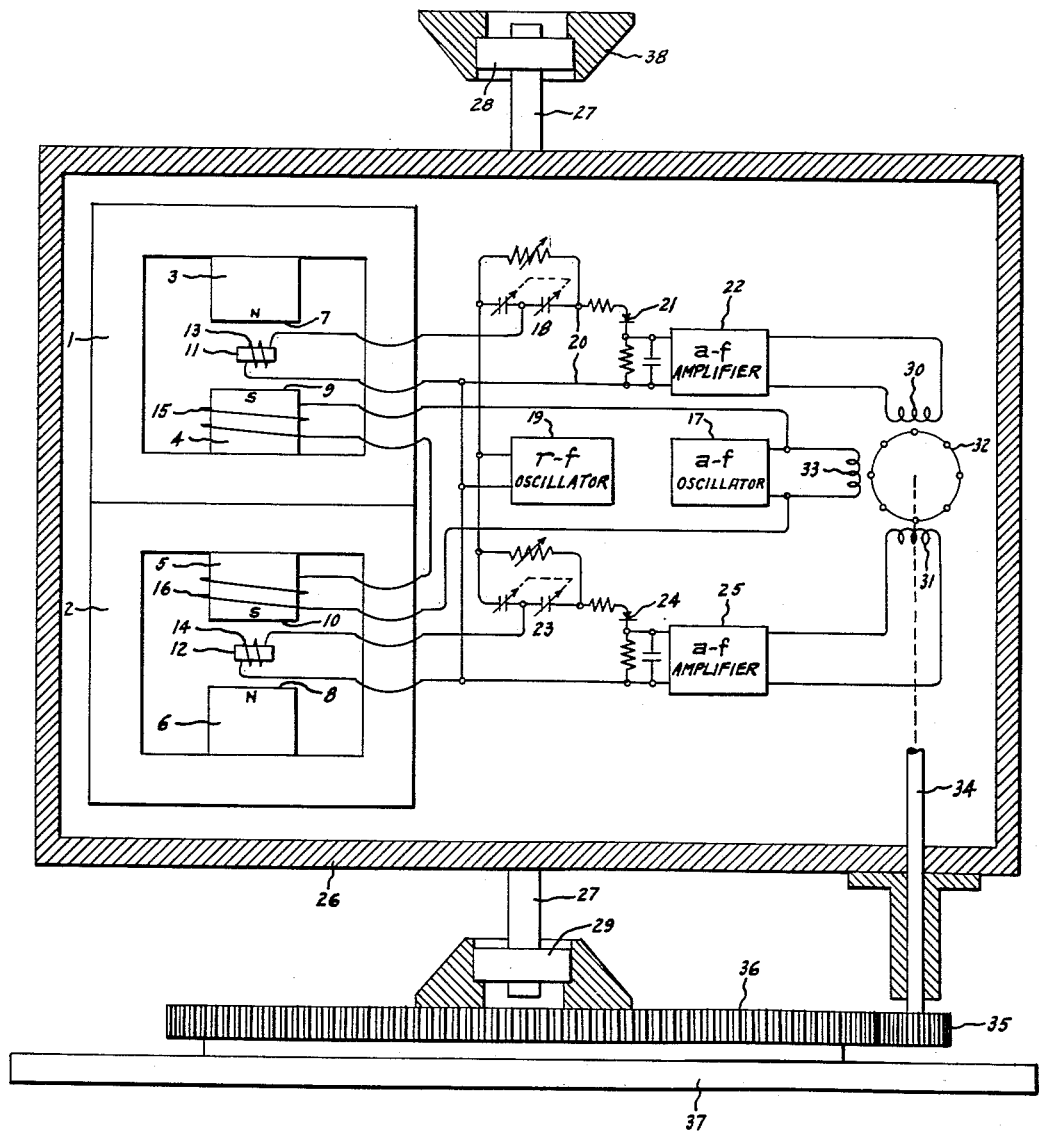

Oct. 11, 1955     B. D. LEETE     2,720,625
APPARATUS FOR MEASURING ANGULAR MOTION
Filed Dec. 6, 1952     2 Sheets-Sheet 1

Inventor:
Bernard D. Leete,
by Richard E. Horley
His Attorney.

Oct. 11, 1955　　　　　B. D. LEETE　　　　2,720,625
APPARATUS FOR MEASURING ANGULAR MOTION
Filed Dec. 6, 1952　　　　　　　　　　　　2 Sheets-Sheet 2

Inventor:
Bernard D. Leete,
by Richard E. Hosley
His Attorney.

United States Patent Office 2,720,625
Patented Oct. 11, 1955

2,720,625

APPARATUS FOR MEASURING ANGULAR MOTION

Bernard D. Leete, Peabody, Mass., assignor to General Electric Company, a corporation of New York Application December 6, 1952, Serial No. 324,542

9 Claims. (Cl. 324—70)

My invention relates to improved apparatus for measuring angular motion, based upon magnetic resonance phenomena.

A brief description of magnetic resonance theory will aid the explanation of my invention. More complete treatments of the theory may be found in texts on atomic physics and in numerous articles which have appeared in scientific and technical publications. It will be understood that the theoretical matter presented here is for illustrative purposes only, and is not intended to limit the scope of my invention.

It is known that the nuclei of many atoms have an angular momentum, or spin, and likewise have a magnetic moment. When such nuclei are placed in a magnetic field, their magnetic moments tend to precess about the field direction at a rate known as the Larmor frequency, the value of which is given by the relation $2\pi v = \gamma H$, where $v$ is the Larmor, or precession frequency, H is the magnetic field intensity, and $\gamma$ is a quantity known as the gyromagnetic ratio which is proportional to the quotient of the magnetic moment of the nucleus divided by its angular momentum. For any one given kind of atomic nucleus, the gyromagnetic ratio is a constant, so that the Larmor frequency is directly proportional to the magnetic field intensity. The nuclei of 26 or more kinds of atoms and isotopes are known to have magnetic moments which precess in this manner. For simplicity in the following discussion, the proton, or hydrogen nucleus, will be considered as a typical example, but my invention is not limited to the use of protons, since other nuclei may be used without materially altering the principles involved.

Chemical bonds appear to have no appreciable effect on the Larmor frequency. Consequently, the protons used in magnetic resonance apparatus may be hydrogen nuclei in any convenient chemical combination—for example, ordinary water. However, in practice small quantities of other substances, such as manganous sulphate or other paramagnetic salts, are often dissolved in the water for well-known reasons having to do with the "relaxation time," which need not be discussed to explain the present invention. A $\frac{1}{250}$ molar solution of manganous sulphate in one cc. of distilled water has been employed with good results as a proton sample in magnetic resonance equipment.

The gyromagnetic ratio $\gamma$ of the proton is approximately $2.67 \times 10^4$ per oersted-second. Thus, the Larmor frequency of proton precession in a magnetic field of H oersteds is $$\frac{2.67}{2\pi} \times 10^4 \times H \text{ cycles per second}$$

For example, if H is 10,000 oersteds, the Larmor frequency is approximately 42.5 megacycles per second.

Assume that a large number of protons are placed in a homogeneous, unidirectional magnetic field, so that the magnetic moments precess about the field direction at the Larmor frequency. Considering the geometric projections of the proton magnetic moments on the field direction, it will be found that two orientations of the protons exist: some of the protons have their magnetic moments aligned with the field, which is called the parallel orientation, while others have their magnetic moments aligned against the field, which is called the anti-parallel orientation. The anti-parallel orientation represents a higher energy level than the parallel orientation, since work must be done to turn the magnetic moments against the field. However, at temperatures normally encountered, the energy difference between the two orientations is very small compared to the energy of thermal agitation.

Because of the thermal effects, frequent transitions of individual nuclei from one orientation to the other occur, but if the protons are in thermal equilibrium, it is known that the probability as a function of time for a transition from the higher energy level to the lower energy level is slightly greater than the probability for the reverse transition, so that, under such conditions, on the average a slightly larger number of protons will be found in the lower-energy parallel orinetation than in the higher-energy anti-parallel orientation. For example, of 2,000,000 protons in thermal equilibrium at room temperature, 1,000,007 may have the parallel orientation, while the remainder have the anti-parallel orientation.

Assume that a second magnetic field is introduced at right angles to the first field, and that the second field alternates at the Larmor frequency of the protons precessing in the first field. Now, those protons having the low-energy parallel orientation can absorb energy from the alternating field, which increases the probability of transitions from the parallel orientation to the higher-energy anti-parallel orientation and thus tends to equalize the numbers of protons in the two energy levels. If the alternating field is sufficiently strong, the proton populations in the two energy levels soon become substantially equal, and no more energy is absorbed. But if the alternating field is a bit weaker, the absorption of energy by the protons from the alternating field may be balanced by their tendency to return to thermal equilibrium, so that there can be substantially continuous absorption of energy from the alternating field. Therefore, there is an optimum strength of the alternating field, which can be determined by experimental adjustment, at which maximum energy is absorbed by the protons. Although quantum considerations prohibit more than two orientations of protons in a magnetic field, other nuclei may have as many as 10 possible orientations. This does not affect the basic principles involved, since transitions may still take place between adjacent energy levels represented by different orientations.

This absorption of energy by precessing nuclei, which generally occurs only when the frequency of the alternating field is substantially the same as the Larmor frequency of the nuclei, is called nuclear magnetic resonance. Similar phenomena, known as electronic magnetic resonance, can occur in substances having uncoupled electrons. In general, there are two classes of such substances, one class being strongly paramagnetic salts, and the other class being ferromagnetic metals and alloys.

For electronic magnetic resonance in paramagnetic salts, sometimes called paramagnetic resonance, the same relations apply as in proton resonance, except that the gyromagnetic ratio of the electron is used in place of the gyromagnetic ratio of the proton. Since the electron has a gyromagnetic ratio which is about 700 times as large as that of the proton, the Larmor frequency for paramagnetic resonance is about 700 times as that for proton resonance in the same magnetic field.

In ferromagnetic metals and alloys, the magnetic induction B inside the metal is not substantially equal to the magnetic field intensity H. In this electronic resonance case, sometimes called ferromagnetic resonance, the Larmor frequency $v$ is given by the relation $$2\pi v = \delta\sqrt{BH}$$

where $\delta$ is the gyromagnetic ratio of the electron, H is the magnetic field intensity, and B represents the magnetic induction which is equal to the product of the magnetic field intensity and the permeability of the metal. The present invention may utilize either nuclear magnetic resonance or electronic magnetic resonance. The generic term "magnetic resonance" includes both. Since the basic principles are the same, only nuclear resonance need be discussed in detail.

The magnetic resonance phenomenon can be detected by various means, several of which are well known. For example, assume that the alternating field is supplied by a suitably energized coil placed around the proton sample, which is a common arrangement in nuclear resonance apparatus. Energy absorption from the field by the protons at resonance causes a measurable decrease in the apparent "Q" of the coil, where Q is the well-known symbol for the ratio of energy stored per cycle to energy dissipated per cycle. This is known as the absorption effect. There is also a small, but measurable, change in the apparent inductance of the coil. This is known as the dispersion effect. Furthermore, when a second coil is placed near the proton sample with its axis orthogonal to the respective directions of the two applied magnetic fields, at resonance the precessing proton magnetic moments induce an alternating voltage in the second coil. This is known as the induction effect. While any of these three effects may be used to detect the existence of magnetic resonance conditions, in practice the absorption and induction effects are most frequently used.

As set forth in the co-pending application of Albert Hansen, Jr., Serial No. 313,153, filed October 4, 1952, and entitled "Method for Measuring Angular Motion," it has also been found that the nuclear or electronic precession frequency, as given by the magnetic resonance relations, must be referred to irrotational space coordinates; that is, the Larmor frequency $v$ computed from the magnetic resonance relations as hereinbefore stated must be taken with reference to a coordinate system which does not rotate in space. Assuming that the magnetic resonance apparatus, and in particular the means providing the alternating magnetic field, rotates in space about the axis of the other field with an angular velocity $w$, the frequency $f$ of the alternating field which satisfies the resonance condition, as it appears to an observer rotating with the apparatus, differs from the Larmor frequency according to the relation $$v = f + \frac{w}{2\pi}$$

Since $v$ can be computed when the magnetic intensity H and the gyromagnetic ratio $\delta$ are known, and since $f$ can be measured, this relation can be used to measure values of the angular velocity $w$, and, if desired, the velocity can be integrated to determine angular displacement. For example, assume that $f$, $\delta$, and H are all kept precisely constant. Then the magnetic resonance absorption of energy will vary as a function of $w$, and these variations can be measured to determine values of the absolute angular motion of the apparatus. However, the problem of keeping $f$ and H constant with sufficient precision presents a substantial practical difficulty.

A principal object of my invention is to provide improved apparatus for measuring angular motion, based upon magnetic resonance phenomena, in which the precision of measurement is not materially decreased by small variations in the values of $f$ and H. Another object is to provide improved apparatus for indicating changes in heading of airplanes, ships or other craft. Other objects and advantages will appear as the description proceeds.

Briefly stated, according to one aspect of my invention, I provide two magnetic resonance systems which are similarly affected by changes in the values of $f$ and H, and are differently affected by changes in the value of $w$. In particular, I provide equal but oppositely directed magnetic fields in two magnetic resonance samples. Since the two fields are oppositely directed, the respective directions of precession in the two samples are opposed, so that the angular velocity $w$ is positive with respect to one sample and negative with respect to the other. That is, with respect to one sample $$v = f + \frac{w}{2\pi}$$

while with respect to the other sample $$v = f - \frac{w}{2\pi}$$

Since the two fields are equal, changes in the value of H affect both samples in the same way. A common frequency source is used for both samples, so that changes in the value of $f$ also affect both samples in the same way. However, changes in the value of $w$ affect the two samples differently.

My invention will be better understood from the following description taken in connection with the accompanying drawings, and its scope will be pointed out in the appended claims. In the drawings, Fig. 1 is a schematic representation of apparatus embodying principles of my invention, and Fig. 2 is a schematic representation of an alternative magnetic structure useful in such apparatus.

Figure 2:
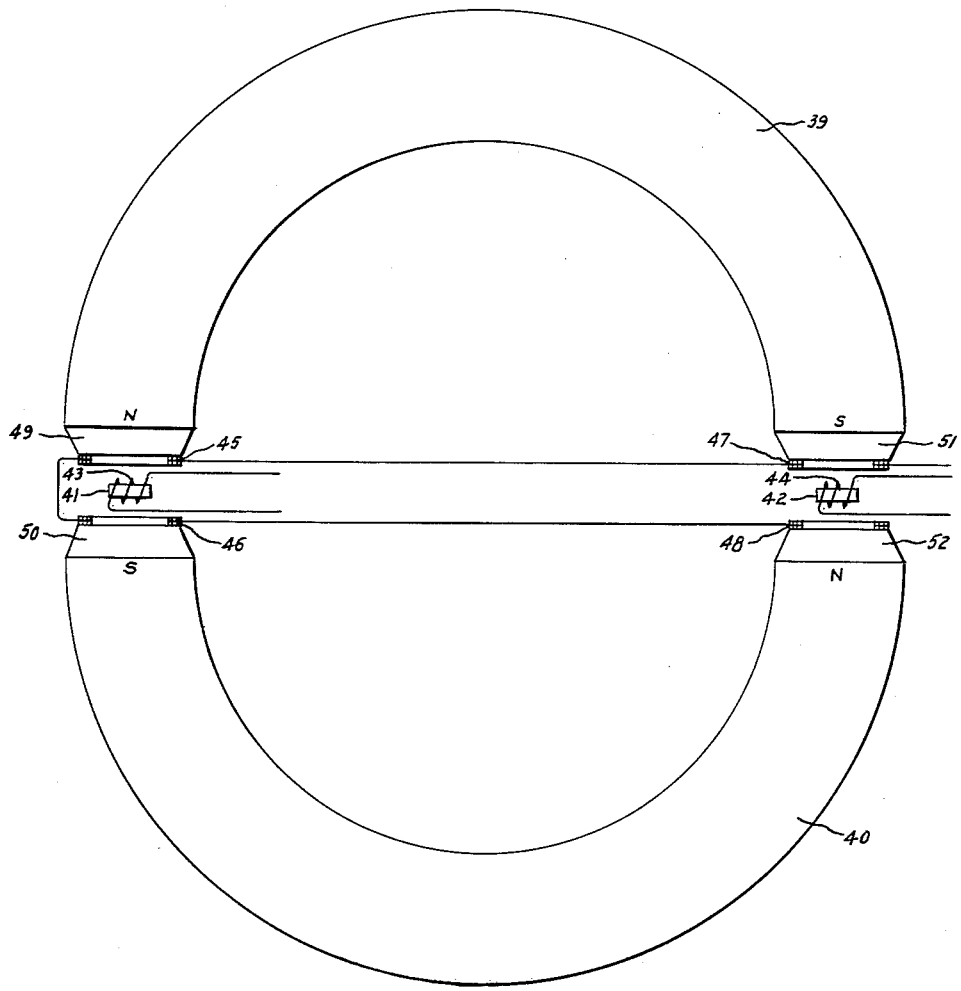

Referring now to Fig. 1, a magnetic structure comprises two similar parts, 1 and 2. These parts have respective center legs comprising identical pairs of small permanent magnets, 3, 4, 5 and 6, arranged with substantially equal gaps between magnets 3 and 4 and between magnets 5 and 6, as shown. These magnets provide north poles at 7 and 8 and south poles at 9 and 10, so that equal, but oppositely directed, magnetic fields are provided across the two gaps. Although such factors as temperature variations may cause small changes in the strength of the magnets, or small changes in the dimensions of the gaps, the two fields remain substantially equal since the two magnetic circuits are identical.

Magnetic resonance samples 11 and 12 are located in the respective gaps as shown. If proton resonance is to be used, the magnetic resonance samples may be water contained in small glass tubes sealed at each end, or other suitable containers. Coils 13 and 14 are positioned about samples 11 and 12 respectively, with the coil axes perpendicular to the magnetic fields across the gaps. To assist the detection of magnetic resonance conditions, the magnetic intensities within the gaps are modulated at an audio frequency by suitable means, such as modulating windings 15 and 16 energized, for example, by an audio-frequency oscillator 17.

Coil 13 is connected in a bridge circuit 18 energized by a radio-frequency oscillator 19, so that radio-frequency current is supplied to coil 13, whereby an alternating magnetic field is applied to sample 11 perpendicular to the field across the gap between magnets 3 and 4. The magnetic intensity within the gap and the frequency of oscillator 19 are chosen such that substantial magnetic resonance conditions exist in sample 11.

Bridge circuit 18 may be of the well-known bridged-T type as shown, but it will be appreciated that numerous other bridge circuits may be used with good results. The bridged-T circuit has zero transfer admittance when it is adjusted to balance. Assume, for example, that the bridge is balanced when there is no magnetic resonance absorption of energy by sample 11. At magnetic resonance, sample 11 absorbs energy, thereby increasing the apparent resistance of coil 13, and unbalancing the bridge. Consequently, as the magnetic intensity in sample 11 is modulated through the magnetic resonance value, a radio frequency signal appears across the output terminals 20 of bridge 18, which is amplitude modulated at an audio frequency. This signal is demodulated by suitable means, such as rectifier-demodulator 21, and amplified by an audio-frequency amplifier 22 to provide an audio-frequency error signal having an amplitude which is related to deviations of the average magnetic intensity in sample 11 from the magnetic resonance value, and having a phase which depends upon whether the average magnetic intensity in sample 11 is above or below the magnetic resonance value. In practice, it is not essential that the bridge circuit be precisely balanced—in fact, some unbalance may be desirable.

Similarly, coil 14 is connected in a bridge circuit 23 which is also energized by radio-frequency oscillator 19. The output signal from bridge circuit 23 is demodulated by rectifier-demodulator 24 and amplified by audio-frequency amplifier 25 to provide a second audio-frequency error signal having an amplitude which is related to the difference between the average magnetic intensity in sample 12 and the magnetic resonance value, and having a phase which depends upon whether the average magnetic intensity in sample 12 is above or below the magnetic resonance value.

The gyromagnetic ratios $\gamma$ for the two samples being equal, and the magnetic intensities also being equal, the Larmor frequency for sample 11 is precisely the same as the Larmor frequency for sample 12. Furthermore, coils 13 and 14 are energized at exactly the same frequency by the common radio-frequency oscillator 19. Therefore, when there is no rotation of the apparatus, identical magnetic resonance conditions exist in the two samples, and the two error signals supplied by amplifiers 22 and 25, respectively, must be identical. However, when the apparatus rotates in space the magnetic resonance conditions in the two samples are not identical, as is evident from the relations hereinbefore given, and the two error signals are not identical.

Preferably, the magnetic resonance apparatus is enclosed in a housing 26, supported upon a shaft 27 which is rotatable about bearings 28 and 29. Thus, housing 26 is rotatable about an axis parallel to the direction of the magnetic fields across the two gaps of the magnetic structure. Housing 26 may be of ferromagnetic material to provide shielding of the magnetic structure from external magnetic fields.

The error signals from amplifiers 22 and 25 are applied to opposed control windings 30 and 31, respectively, of a two-phase induction servomotor 32. The field winding 33 of servomotor 32 is energized by connections to audio-frequency oscillator 17, so that motor 32 operates at a speed and in a direction corresponding to differences between the two error signals. Motor 32 is connected to a shaft 34 which rotates a pinion 35 in engagement with a stationary gear 36 mounted upon a suitable base plate 37. Any small rotation of the apparatus produces a difference between the two error signals, as hereinbefore explained, which operates motor 32 and thus, by rotation of pinion 35, rotates housing 26 in a direction to oppose such rotation, and thus to keep the housing aligned in a fixed direction.

The apparatus described may be installed in an airplane, ship, or other craft, with shaft 27 vertical, and base plate 37 and the upper bearing bracket 38 suitably attached to the craft. When the craft changes heading, the resulting rotation of the apparatus operates motor 32 to rotate housing 26 relative to the craft, and keep the housing 26 substantially aligned in its original direction. Thus, by observing the alignment of housing 26 relative to the craft, changes in heading of the craft can be determined.

If desired, electric power for the oscillators and amplifiers can be supplied through slip rings, not shown, attached to shaft 27.

Fig. 2 shows an alternative magnetic structure which may be used in my improved apparatus. The magnetic structure comprises two substantially semi-circular permanent magnets 39 and 40, arranged as shown, with substantially equal gaps between the respective ends of the two magnets. Since the two gaps are in series in the same magnetic circuit, the magnetic flux across the two gaps must be the same, except for differences in "fringing" fluxes around the respective gaps. These differences in fringing fluxes are minimized by the symmetry of the construction. Consequently, the magnetic fields of equal strength are provided in the two gaps, and these fields are oppositely directed since the two gaps are on opposite sides of the circuit. Magnetic resonance samples 41 and 42 are located within the respective gaps as shown, and radio frequency coils 43 and 44 are provided about the samples in the usual manner. The modulating windings preferably are in the form of small annular coils 45, 46, 47 and 48 placed at the tips of the magnet poles. The portions 49, 50, 51 and 52 at each end of each permanent magnet are preferably soft iron pole pieces, to provide more homogeneous fields within the gaps. Other parts of the apparatus may be identical to that shown in Fig. 1.

It will be understood that my invention is not limited to the specific embodiments herein illustrated and described, and that the following claims are intended to cover all changes and modifications which do not depart from the true spirit and scope of the invention.

What I claim as new and desire to secure by Letters Patent of the United States is:

1. Apparatus for measuring angular motion, comprising at least two magnetic resonance samples, means providing oppositely directed magnetic fields in said samples, means for rotating said apparatus about an axis parallel to the direction of said magnetic fields, means for establishing substantially identical magnetic resonance conditions at said two samples when said apparatus is at rest, said magnetic resonance conditions changing unequally at said two samples in response to rotation of said apparatus, and means responsive to said unequal changes for producing an effect indicative of the angular motion to be measured.

2. Apparatus for measuring angular motion, comprising a magnetic structure having at least two gaps, means providing equal but oppositely directed magnetic fields across said gaps, two magnetic resonance samples respectively located in said two gaps, means for rotating said apparatus about an axis parallel to the direction of said magnetic fields, means for establishing substantially identical magnetic resonance conditions at said two samples when said apparatus is at rest, said magnetic resonance conditions changing unequally at said two samples in response to rotation of said apparatus, and means responsive to said unequal changes for producing an effect indicative of the angular motion to be measured.

3. Apparatus for measuring angular motion, comprising a magnetic structure having at least two gaps, means providing equal but oppositely directed magnetic fields across said gaps, two magnetic resonance samples respectively located in said two gaps, a rotatable housing for said structure said housing being rotatable about an axis parallel to the direction of said magnetic fields, means for establishing substantially identical magnetic resonance conditions at said two samples when said apparatus is at rest, said magnetic resonance conditions changing unequally at said two samples in response to rotation of said apparatus, and means responsive to said unequal changes for automatically rotating said housing to re-establish substantially identical magnetic resonance conditions at said two samples.

4. Apparatus for measuring angular motion, comprising a magnetic structure having at least two gaps, means providing equal but oppositely directed magnetic fields across said two gaps, two magnetic resonance samples respectively located in said two gaps, means for rotating said apparatus about an axis parallel to the direction of said magnetic fields first magnetic resonance apparatus supplying a first error signal in response to rotation of said apparatus, said first signal being related in value to the difference between the average magnetic intensity and the magnetic resonance value in said first sample, second magnetic resonance apparatus supplying a second error signal in response to rotation of said apparatus, said second signal being related in value to the difference between the average magnetic intensity and the magnetic resonance value in said second sample, and means responsive to differences between the respective values of said first and second error signals for producing an effect indicative of the angular motion to be measured.

5. Apparatus for measuring angular motion, comprising a magnetic structure having at least two gaps, means providing equal but oppositely directed magnetic fields across said two gaps, means for rotating said apparatus about an axis parallel to the direction of said magnetic fields, means shielding said structure from external magnetic fields, means modulating the magnetic intensities in said gaps at an audio frequency, two magnetic resonance samples respectively located in said two gaps, two coils positioned about said two samples respectively with the coil axes perpendicular to the magnetic fields across said gaps, a radio-frequency oscillator, first and second bridge circuits each energized by said oscillator, said two coils being respectively connected in said two bridge circuits and thereby energized at the radio frequency of said oscillator, said bridge circuits becoming unbalanced upon the attainment of magnetic resonance conditions at said samples and each providing when said apparatus is at rest an identical radio-frequency output signal which is amplitude modulated in accordance with the magnetic resonance absorption of energy by the corresponding one of said samples, said output signals being different in response to rotation of said apparatus, means demodulating and amplifying the output signal of said first bridge circuit to provide a first error signal, means demodulating and amplifying the output signal of said second bridge circuit to provide a second error signal, and means responsive to differences between respective values of said first and second error signals for producing an effect indicative of the angular motion to be measured.

6. Apparatus for measuring angular motion, comprising a magnetic structure having at least two gaps, a magnetic shielding and housing for said magnetic structure, said housing being rotatable about an axis parallel to the magnetic fields across said gaps, means providing equal but oppositely directed magnetic fields across said two gaps, means modulating the magnetic intensities in said gaps at an audio frequency, two magnetic resonance samples respectively located in said two gaps, two coils positioned about said two samples respectively with the coil axes perpendicular to the magnetic fields across said gaps, a radio-frequency oscillator, first and second bridge circuits each energized by said oscillator, said two coils being respectively connected in said two bridge circuits and thereby energized at the radio frequency of said oscillator, said bridge circuits becoming unbalanced upon the attainment of magnetic resonance conditions at said samples and each providing a radio-frequency output signal which is amplitude modulated in accordance with the magnetic resonance absorption of energy by the corresponding one of said samples, said output signals being different in response to rotation of said apparatus means demodulating and amplifying the output signal of said first bridge circuit to provide a first audio frequency error signal, means demodulating and amplifying the output signal of said second bridge circuit to provide a second audio-frequency error signal, and servomotor means rotating said housing in response to differences between the respective values of said first and second error signals and in a direction to eliminate the differences between the values of said first and second error signals.

7. Apparatus for measuring angular motion, comprising a magnetic structure including two identical pair of permanent magnets arranged with substantially equal gaps between the magnets of each pair so that said magnets provide equal but oppositely directed magnetic fields across said two gaps, two magnetic resonance samples respectively located in said two gaps, means for rotating said apparatus about an axis parallel to the direction of said magnetic fields, means for establishing substantially identical magnetic resonance conditions at said two samples when said apparatus is at rest, said magnetic resonance conditions changing unequally at said two samples in response to rotation of said apparatus, and means responsive to said unequal changes for producing an effect indicative of the angular motion to be measured.

8. Apparatus for measuring angular motion, comprising, in combination, a pair of identical substantially semi-circular magnets arranged with two substantially equal gaps between respective ends thereof, the opposing ends of said magnets being of opposite polarity whereby equal but oppositely directed magnetic fields are provided across said gaps, two magnetic resonance samples respectively located in said two gaps, means for rotating said apparatus about an axis parallel to the direction of said magnetic fields, means for establishing substantially identical magnetic resonance conditions at said two samples when said apparatus is at rest, said magnetic resonance conditions changing unequally at said two samples in response to rotation of said apparatus, and means responsive to said unequal changes for producing an effect indicative of the angular motion to be measured.

9. Apparatus for measuring angular motion, comprising a member forming a magnetic circuit having two substantially equal gaps located on opposite sides thereof and magnetically in series so that equal but oppositely directed magnetic fields are provided across said two gaps, two magnetic resonance samples respectively located in said two gaps, means for rotating said apparatus about an axis parallel to the direction of said magnetic fields, means for establishing substantially identical magnetic resonance conditions at said two samples when said apparatus is at rest, said magnetic resonance conditions changing unequally at said two samples in response to rotation of said apparatus, and means responsive to said unequal changes for producing an effect indicative of the angular motion to be measured.

References Cited in the file of this patent

UNITED STATES PATENTS 2,589,494     Hershberger             Mar. 18, 1952